United States Patent [19]

Surie et al.

[11] Patent Number: 4,599,735
[45] Date of Patent: Jul. 8, 1986

[54] TIMING RECOVERY CIRCUIT FOR SYNCHRONOUS DATA TRANSMISSION USING COMBINATION OF L BI PHASE AND MODIFIED BIPHASE CODES

[75] Inventors: Serge Surie, L'Hay Les Roses; Francois Marcel, Orsay, both of France

[73] Assignee: Compagnie Industrielle des Telecommunication Cit-Alcatel, Paris, France

[21] Appl. No.: 587,778

[22] Filed: Mar. 9, 1984

[30] Foreign Application Priority Data

Mar. 11, 1983 [FR] France ................ 83 04038
Dec. 1, 1983 [FR] France ................ 83 19211

[51] Int. Cl.⁴ .................. H04L 7/02; H04L 27/18
[52] U.S. Cl. ............................ 375/54; 375/85; 375/95; 375/110; 307/234; 307/511; 328/110; 329/126
[58] Field of Search ............ 375/54, 85, 86, 87, 375/110, 118, 119, 120, 95; 307/234, 511, 520; 328/110; 329/122, 126; 360/42, 44

[56] References Cited

U.S. PATENT DOCUMENTS

| | | | |
|---|---|---|---|
| 3,916,324 | 10/1975 | Shuda | 375/54 |
| 3,968,328 | 7/1976 | Tsuchiya et al. | 375/95 |
| 4,232,197 | 11/1980 | Acampora et al. | 370/104 |
| 4,276,650 | 6/1981 | de Jager et al. | 375/110 |
| 4,301,417 | 11/1981 | Jansen et al. | 375/85 |
| 4,320,525 | 3/1982 | Woodward | 360/44 |

FOREIGN PATENT DOCUMENTS

WO81/02656 9/1981 PCT Int'l Appl. .

OTHER PUBLICATIONS

Patent Abstracts of Japan, vol. 2, No. 97, 8/15/78, p. 4787 E 78.
IEEE Transactions on Magnetics, vol. MAG-15, No. 6, Nov. 1979, pp. 1466 to 1467.
Nachrichtentechnische Zeitschrift, vol. 23, No. 1, Jan. 1970, pp. 11–16.

*Primary Examiner*—Benedict V. Safourek
*Assistant Examiner*—Raymond C. Glenny
*Attorney, Agent, or Firm*—Sughrue, Mion, Zinn, Macpeak & Seas

[57] ABSTRACT

A timing recovery circuit for synchronous data transmission using a signal which, in the baseband, is formed by a succession of two-level signal elements, without overlap, and of duration T, able to take one of the four forms defined by the functions:

$$\pm \text{sign}\left(\sin\frac{2\pi t}{T}\right) \; ; \; \pm \text{sign}\left(\cos\frac{2\pi t}{T}\right)$$

comprises a transition selection circuit. This circuit selects transitions in the received signal, in the baseband, separated from those which immediately precede them by a time-delay situated in an arbitrary range. This range brackets a symbol duration of between ¾ and 5/4 times, exclusive, the duration of a signal element. A timebase which is synchronized on the transitions selected by the selection circuit delivers the signal element recovered timing.

5 Claims, 5 Drawing Figures

TIMING RECOVERY CIRCUIT FOR SYNCHRONOUS DATA TRANSMISSION USING COMBINATION OF L BI PHASE AND MODIFIED BIPHASE CODES

BACKGROUND OF THE INVENTION

1. Field of the Invention

The present invention concerns synchronous data transmission using a signal which, in the baseband, is formed by a succession of two-level signal elements without overlap, isochronous, of duration T, and able to take one of the four forms defined by the functions:

$$\pm \text{sign}\left(\sin \frac{2\pi t}{T}\right) ; \pm \text{sign}\left(\cos \frac{2\pi t}{T}\right)$$

2. Description of the Prior Art

Such synchronous data transmission results from a combination of the L biphase and modified biphase codes.

The L biphase code, also known as the "Manchester" code, converts a sequence of binary information available at the frequency 1/T into a transmission signal formed by a succession of two-level signal elements which are isochronous and without overlap, having halfway through their period a transition whose direction depends on the value of the coded binary information.

The modified biphase code converts a sequence of binary information available at the frequency 1/T into a transmission signal formed by a succession of two-level signal elements which are isochronous and without overlap, having two transitions in opposite directions at the end of the first and third quarter-periods, the direction of the first transition depending on the value of the coded binary information.

For the same Baud period 1/T, the signals resulting from the L biphase and modified biphase codes have principal frequency spectrum lobes of the same width 0.2/T with a maximum shifted towards the low frequencies for the L biphase code and towards the high frequencies for the modified biphase code. They have the special feature that they may be considered as double sideband modulations of two Walsh functions in phase quadrature:

$$\text{sign}\left(\sin \frac{2\pi t}{T}\right) ; \text{sign}\left(\cos \frac{2\pi t}{T}\right)$$

and of being combinable with a modulation in phase quadrature to define a code for which the line signal $z'(t)$ may be expressed as follows, ignoring any multiplying factor:

$$z'(t) = \sum_K \left[ (a_K + b_K) \text{sign}\left(\cos \frac{2\pi t}{T}\right) + (a_K - b_K) \text{sign}\left(\sin \frac{2\pi t}{T}\right) \right] d(t - KT)$$

where $a_K$ and $b_K$ are two synchronous streams of binary information to be transmitted of value $\pm 1$ available at the frequency 1/T and $d(t-KT)$ is a time function having a unity value in the Kth Baud interval and a null value at all other times. This code has the benefit of doubling the information bit rate as compared with the L biphase and modified biphase codes without doubling the bandwidth occupied. Its signal element may take one of the four possible forms defined by the functions:

$$\pm \text{sign}\left(\sin \frac{2\pi t}{T}\right) ; \pm \text{sign}\left(\cos \frac{2\pi t}{T}\right)$$

and which may be distinguished from one another by the values assumed by the levels during their second and third quarter-periods.

With this type of transmission code it is a simple matter to mark in the received signal, in the baseband, the Baud periods of the signal elements to the nearest $K\pi/2$ by synchronizing on the transitions, although it is more difficult to resolve the $K\pi/2$ uncertainty. It is not possible to resolve this uncertainty in the same way as the $K\pi$ uncertainty occurring with the L biphase code, by distinguishing the transitions halfway through the Baud period from those at the ends of the Baud period, by virtue of the fact that the former appear systematically and the latter do not, or in the same way as the $K\pi/2$ uncertainty occurring with the modified biphase code, based on the systematic absence of transitions halfway through the Baud period, as these two criteria are no longer valid.

The objective of the present invention is to overcome the aforementioned problem with the aid of a simple circuit which is readily implemented in digital form.

SUMMARY OF THE INVENTION

The present invention consists in a timing recovery circuit comprising a selection circuit adapted to select transitions in the received signal, in the baseband, separated from those which immediately precede them by a time-delay situated in an arbitrary range, bracketing a symbol duration of between ¾ and 5/4 times, exclusive, the duration of a signal element, and a timebase which is synchronized on the transitions selected by said selection circuit and which delivers the signal element recovered timing.

In a preferred embodiment, the timebase comprises an oscillator delivering a clock signal at a frequency which is a multiple of that of the signal elements and a divider which generates a first recovered timing signal from said clock signal and which is reset to zero on each transition retained by the selection circuit. The oscillator is advantageously provided with a high time contant phase-locked loop locked onto the output signal of the divider so as to generate a second recovered timing signal free of spurious phase jumps and jitter.

Likewise in a preferred embodiment, the transition selection circuit comprises:

a transition detector generating a short duration pulse in response to each transition of the received signal, in the baseband, a gate selecting the pulses, inserted between the output of the transition detector and a synchronization input of the timebase, a time counter which is reset to zero by the pulses from the transition detector and which generates an order to open the gate when its count reaches the value corresponding to a given duration slightly less than that of a signal element, and a circuit for holding said order for a short time interval, inserted between the counter and the gate.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

In a signal resulting from a contiguous succession without overlaps of isochronous signal elements of duration T able to take one of the four possible forms defined by the functions:

$$\pm \text{sign}\left(\sin\frac{2\pi t}{T}\right) \; ; \; \pm \text{sign}\left(\cos\frac{2\pi t}{T}\right)$$

it is observed that the consecutive transitions are spaced by a duration less than the duration T of a signal element except for two consecutive elements which have forms defined in the case of one of them by the function:

$$+ \text{sign}\left(\sin\frac{2\pi t}{T}\right)$$

and in the case of the other of them by the function:

$$- \text{sign}\left(\sin\frac{2\pi t}{T}\right)$$

in which the transitions halfway through the period of each signal element follow on from one another at a time interval T without being separated by other transitions. The transitions separated from those which immediately precede them by the duration T of a signal element thus unambiguously mark the halfway point in the period of a signal element.

Assuming that the four signal element forms are of equal probability, which can always be achieved by previous scrambling of the data to be transmitted, the probability of a succession of two signal elements giving rise to two consecutive transitions separated by the duration T of a signal element is one in eight. This corresponds to an average frequency of occurence of the latter transitions equal to one-sixteenth of the binary bit rate of the transmission, which is amply sufficient for timing synchronization.

Figure 1:
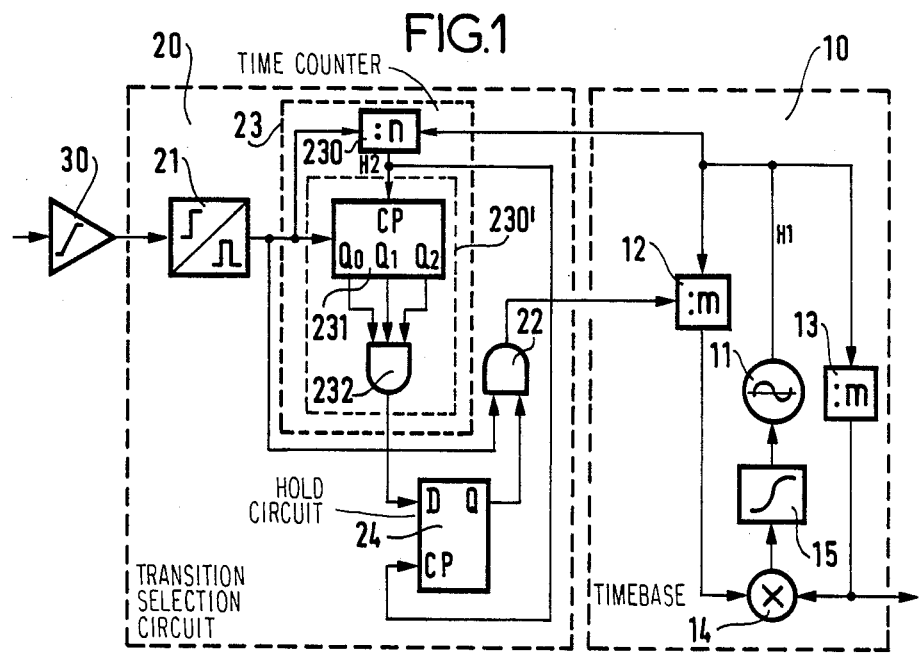
FIG. 1 represents the schematic of a timing recovery circuit in accordance with the invention.

FIG. 1 represents the schematic of a timing recovery circuit synchronized by the transitions separated from those which immediately precede them by substantially the duration T of a signal element. The circuit comprises a timebase 10 synchronized by a transition selection circuit 20 preceded by a signal shaping circuit 30.

The timebase 10 comprises a voltage-controlled oscillator 11 generating a clock signal $H_1$ the frequency of which is very high as compared with the timing frequency of the received signal elements and is equal to an integer multiple m of the latter, a divider by m 12 formed by a counter by m incremented by the clock signal $H_1$ and reset to zero by the transition selection circuit 20 on each occurrence, in the received signal, of a transition separated from that immediately preceding it by a duration subsequently equal to that (T) of a signal element, and a phase-locked loop formed by another divider by m 13 controlled by the clock signal $H_1$, a phase comparator 14 operating on the output signals of the two dividers 12 and 13, and an integrator filter 15 inserted between the phase comparator 14 and a voltage control input of the oscillator 11.

The divider by m 12, reset to zero by the transition selection circuit 20, delivers a first recovered timing signal synchronized on the halfway points in the period of the received signal elements. The first recovered timing signal is not usable as such since it reproduces the phase jitter affecting the transitions used for synchronization and may comprise erroneous phase jumps due to imperfect sorting of the transitions caused by distortion to which the transmission signal is subjected in the line. The phase-locked loop filters these spurious phase jumps and this jitter and delivers, at the output of its divider by m 13, a second recovered timing signal synchronized with the starts of the received signal elements, usable to decode the latter.

The transition selection circuit 20 comprises a transition detector 21 at its input side converting each transition of the received signal elements into a positive pulse, a sorting gate 22 inserted between the output of the transition detector 21 and a synchronization input of the timebase 10, a time counter 23 which is reset to zero by the pulses from the transition detector 21 and which generates an order to open the sorting gate 22 when it reaches the value corresponding to a given duration slightly lower than that of a signal element, and a circuit 24 for holding said order for a short time interval, inserted between the time counter 23 and the sorting gate 22.

The transition detector 21 may be formed by an exclusive-OR gate connected by its two inputs to that of the transition selection circuit 20, one directly and the other through the intermediary of a time-delay circuit, of the RC type, for example, determining the width of the pulse sent, which is selected to be lower than the period of the clock signal $H_1$ of the timebase 10 but sufficient to bring about the resetting to zero of the counter by m 12 of the timebase 10 and of the time counter 23.

The time counter 23 is incremented by the clock signal $H_1$ from the timebase 10. It comprises two counting circuits 230 and 230' in series. The counting circuit 230 is a counter-divider by n controlled by the clock signal $H_1$ and delivering a clock signal $H_2$ which has a frequency eight times higher than that of the signal elements. The counting circuit 230' is formed by a counter by eight 231 which is incremented by the clock signal $H_2$ and of which the parallel outputs $Q_0$, $Q_1$ and $Q_2$ are connected to the inputs of an AND gate 232, the output of which constitutes that of the counting circuit 230'. The counts of the two counting circuits 230 and 230' are reset to zero by the pulses from the transition detector and the output signals from these two circuits are delivered at the output from the time counter 23.

The counting circuit 230' is triggered on a rising edge, the clock signal $H_2$, which is of cyclic ratio ½ between two pulses from the transition detector 21, having for example in this instance a rising edge when the count in the counting circuit 230 passes through zero.

An order to open the sorting gate 22 is sent by the time counter 23 each time the latter reaches the value 15.T/16. An order of this kind results in, at the output from the time counter 23, a falling edge of the clock signal $H_2$ occurring when the signal provided by the counting circuit 230' is at logic "1" indicating that this counting circuit is at seven counting units which represents the approximate value by default of 15.T/16 measured with the assistance of the clock signal $H_2$.

The hold circuit 24 is formed by a falling edge triggered type D bistable which has its D input connected to the output of the counting circuit 230' and which is clocked by the clock signal $H_2$. This bistable registers each order to open the sorting gate 22 given by the time counter 23 and holds this order until the first falling edge of the signal $H_2$ following this order, whereupon the latter is erased.

The sorting gate 22 is an AND gate with two inputs, one connected to the output of the transition detector 21 and the other to the Q output of the type D bistable of the hold circuit 24.

Figure 2:
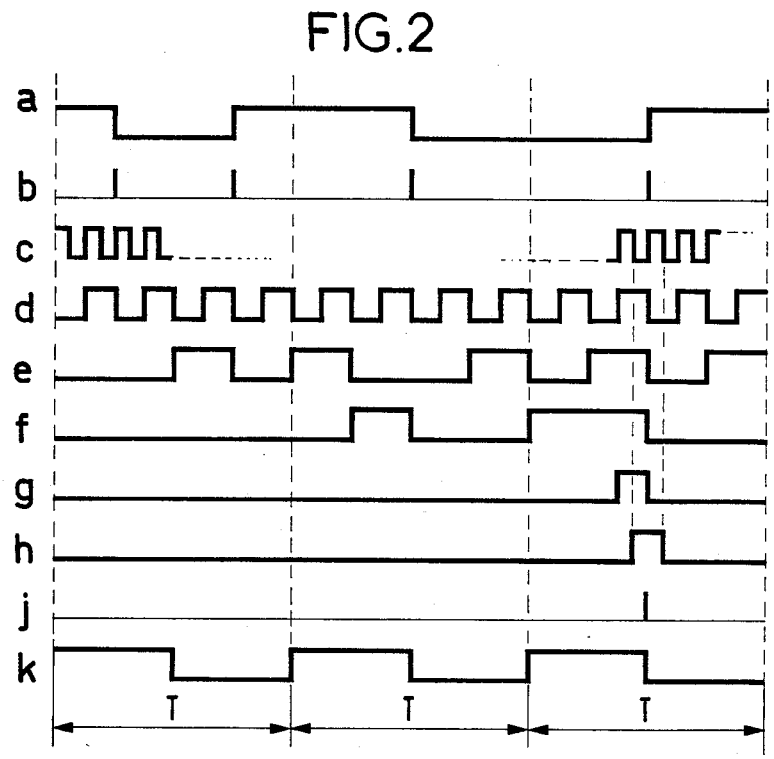
FIG. 2 is a waveform diagram explaining the operation of the timing recovery circuit of FIG. 1.

The operation of the transition selection circuit 20 is illustrated by FIG. 2, which is a diagram of waveforms plotted as a function of time illustrating the output states of the principal units.

The curve a shows a typical succession of three received signal elements of which the limits are marked by the vertical dashed lines. Only the last transition, which is separated from that which precedes it by a duration equal to that (T) of a signal element, is suitable for synchronization purposes.

The curve b represents the corresponding pulse train generated by the transition detector 21.

The curve c represents the clock signal $H_2$ which is at a frequency eight times higher than the signal element timing frequency. The resetting to zero of the counting circuit 230 renders its rising edges coincident with the pulses from the transition detector 21.

The curve d represents the signal at the $Q_0$ output of the counter 231 which is at half the frequency of the clock signal $H_2$ and the transitions in which correspond to the rising edges of the latter. The resetting to zero of the counter 231 renders its falling edges coincident with the pulses from the transition detector 21.

The curve e represents the signal at the $Q_1$ output of the counter 231 the frequency of which is one quarter of that of the clock signal $H_2$ and the transitions in which correspond to the rising edges of the latter. The first and third pulses from the transition detector (curve b) hold it in the low state.

The curve f represents the signal at the $Q_2$ output of the counter 231 the frequency of which is one-eighth that of the clock signal $H_2$ and the transitions in which correspond to the rising edges of the latter. It goes to the high state only when two consecutive transitions detected by the transition detector are separated by more than one signal element half-period.

The curve g represents the output signal of the gate 232 which is also the output signal of the counting circuit 230'. This signal is at logic "1" only when the three parallel outputs $Q_0$, $Q_1$, $Q_2$ of the counter 231 are also at logic "1", that is to say during a period of the clock signal $H_2$ if the counter 231 has been able to count during a period equal to seven-eighths of the period of a signal element.

The curve h represents the output signal of the hold circuit 24 which is none other than the output signal of the counting circuit 230' sampled on the falling edges of the clock signal $H_2$.

The curve j represents the output signal of the gate 22 which is none other than that of the transition selection circuit 20 and which is formed of the pulses from the transition detector 21 which are separated from those which immediately precede them by a duration substantially equal to the (T) of a signal element.

The curve k represents the first recovered timing signal output by the divider by m 12 of the timebase 10 and which is synchronized with the halfway points of certain signal elements including the last of the sequence of three represented by the curve a.

In FIG. 2 there is illustrated a situation in which the transitions in the received signal coincide with the rising edges of the clock signal $H_2$. It will be understood that because of, for example, phase jitter affecting the transitions in the received signal, there may exist a slight offset between these transitions and the rising edges of the clock signal $H_2$. It is readily seen that the sorting gate 22 is open to any pulse generated by the transition detector 21 corresponding to a transition separated from that which immediately preceded it by a duration greater than (T−T/16) but less than (T+T/16), this gate closing after an interval of T/16 from the occurrence of a pulse of this kind.

Figure 3:
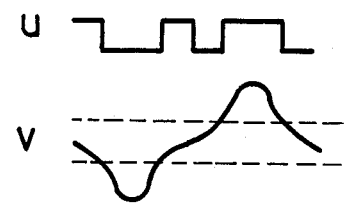
FIG. 3 is a diagram representing a succession of symbols resulting from quadraphase coding and the distortion to which they may be subjected during transmission in the baseband over a telephone line.

The signal resulting from guadraphase coding is formed by a succession of pulses of width T/4, T/2, 3T/4 and T. When it is transmitted in the baseband over a telephone line, it is subjected to low-pass filtering affecting first its shortest pulses of width T/4. This filtering may even be sufficiently severe for one at least of the transitions delimiting these T/4 pulses to disappear. When this occurs with a succession of the two forms of symbols of the modified biphase code as represented at u in FIG. 3, in which two T/4 pulses of alternate sign present consecutively, there appears at the receiving end a signal, as represented at v, which, when applied to a peak limiter signal shaping circuit, results in a false configuration of two consecutive transitions which are separated by the duration of a symbol but placed at the limits rather than at the halfway point of a symbol, and which disrupt timing recovery.

Figure 4:
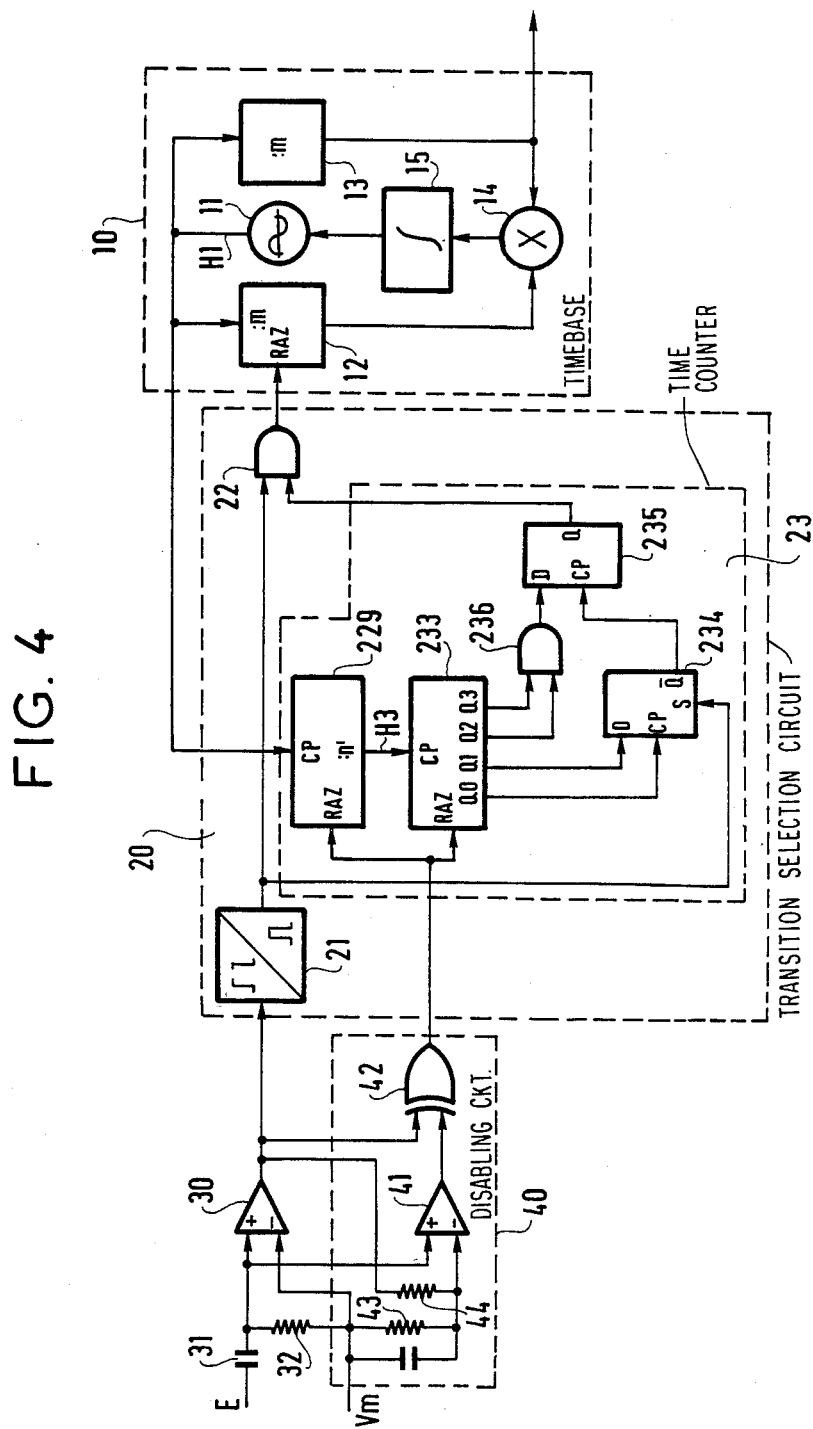
FIG. 4 represents the schematic of a timing recovery circuit rendered relatively insensitive to the deterioration of a quadraphase signal caused by a telephone line.

FIG. 4 shows one example of timing recovery circuit rendered relatively insensitive to these false configurations. This circuit comprises, in addition to the timebase 10 synchronized by a transition selection circuit 20 and a signal shaping circuit 30, a circuit 40 for disabling the transition selection circuit 20.

The timebase 10 is identical to that previously described.

The transition selection circuit 20 differs slightly from that previously described, in terms of the design of the time counter 23 and the holding circuit generating the order to open the sorting logic gate 22.

The time counter 23 and its holding circuit comprise a counter-divider by n' 229 followed by a four-stage binary counter 233 associated with two type D registers 234, 235 and an AND gate 236. The counter-divider by n' 229 is timed by the clock signal $H_1$ from the timebase 10 and reset to zero by the disabling circuit 40 within a certain range around each transition of the received signal, in the baseband. It delivers a clock signal $H_3$ at a frequency sixteen times higher than the frequency of the symbols contained in the received signal. The binary counter 233 is incremented by the clock signal $H_3$ and is reset to zero by the disabling circuit 40 in synchronism with the counter-divider 229. The type D register 234, connected to the $Q_0$ and $Q_1$ outputs of the first and second stages of the binary counter 233 by its clock and data inputs and to the output of the transition detector 21 by its reset to one input, changes state on the rising edges of its clock signal and delivers on its complemented output $\overline{Q}$ a signal at four times the frequency of the symbols received featuring rising edges each time that the time counter reaches the values T/16, 5T/16, 9T/16, 13T/16, etc. The AND gate 236 connected by its inputs to the $Q_2$ and $Q_3$ outputs of the third and fourth stages of the binary counter 238 has logic "1" at its output when the time counter is between the values 12T/16 and 15T/16 inclusive. The type D register 235 connected by its data input to the output of the AND gate 236 and by its input to the $\overline{Q}$ output of the type D register 234 changes state on the rising edges of its clock. Its output goes to logic "1", releasing the sorting gate 22, each time that the time counter reaches the value 13T/16 and goes to logic "0", if not at logic "0" already, each time that the time counter reaches the value T/16.

Once the time counter has reached the value 13T/16, the output of the type D register 235 goes to logic "1", releasing the sorting gate 22. There are then two possibilities, according to whether or not a transition occurs before the time counter has overflowed naturally to the value T/16. If no transition has occurred, the output of the type D register 235 goes to logic "0" and blocks the sorting gate 22 as soon as the time counter again reaches the value T/16. On the other hand, if a transition has occurred and has passed through the sorting gate 22, it will have also provoked through the disabling circuit the resetting to zero of the time counter, during which time the type D register 234 is in an indeterminate state. Blocked with logic "1" on its complemented output it would not, when the time counter again reaches the value T/16, produce the rising edge necessary to change the state of the D register 235, which would delay the blocking of the sorting gate 22 by one-fourth of the duration of a symbol. It is to avoid this that the complemented output $\overline{Q}$ of the type D register 234 is reset to zero on each transition of the received signal through the action of the transition detector 21 on the reset to one input of the type D register 234.

The signal shaping circuit 30 consists of a high-gain differential amplifier operating as a peak limiter. The signal in the baseband formed by the received symbols is applied to the input E of the circuit and passes through a coupling capacitor 31 to the non-inverting input of the differential amplifier. The two inputs of the differential amplifier are biased through the intermediary of a resistor 32 to the average value Vm of the received signal, which is null by virtue of the balanced forms of the symbols of a quadraphase code.

The disabling circuit 40 is formed by a differential amplifier 41 and an exclusive-OR gate 42. The differential amplifier 41 is configured as a comparator with two distinct thresholds, a low threshold used when the signal formed of received symbols has an instantaneous amplitude less than its average value and a high threshold used in the contrary case. To this end, it has its non-inverting input connected to the input E through the intermediary of the coupling capacitor 31, in parallel with that of the differential amplifier of the signal shaping circuit 30, and its inverting input connected to the intermediate tap of a resistive divider bridge 43, 44 connected between the output and the inverting input of the differential amplifier of the signal shaping circuit 30. The exclusive-OR gate 42 has two inputs connected to the outputs of the differential amplifier 41 and of the signal shaping circuit 30.

When the instantaneous amplitude of the signal applied to the input E is less than the average value of the signal, the output of the differential amplifier of the signal shaping circuit 30 is at the low level, resulting in selection of the low threshold for the differential amplifier 41 and non-inverting operation of the exclusive-OR gate 42. If the instantaneous amplitude of the signal applied to the input E is below the low threshold, the differential amplifier 41 generates at its output a low logic level transmitted by the exclusive-OR gate 42 at the output of the disabling circuit 40, corresponding to an inactive state of the latter. If the instantaneous amplitude of the signal applied to the input E is above the low threshold while remaining below the average value of the signal, the differential amplifier 41 generates at its output a high logic level, transmitted by the exclusive-OR gate 42 at the output of the disabling circuit 40, resulting in the resetting to zero of the time counter 23.

When the instantaneous amplitude of the signal applied to the input E is above the average value of the signal, the output of the differential amplifier of the signal shaping circuit 30 is at the high level resulting in selection of the high threshold for the differential amplifier 41 and inverting operation of the exclusive-OR gate 42. If the instantaneous amplitude of the signal applied to the input E, whilst being above the average value of the signal, remains below the high threshold, the differential amplifier 41 generates a low logic level which is converted by the exclusive-OR gate 42 to a high logic level at the output of the disabling circuit 40, resulting in the resetting to zero of the time counter 23. If the instantaneous amplitude of the signal applied to the input E is above the high threshold, the differential amplifier 41 generates at its output a high logic level which is converted by the exclusive-OR gate 42 to a low logic level at the output from the disabling circuit 40, corresponding to an inactive state of the latter.

To summarise, the logic level at the output of the disabling circuit 40 is low when the instantaneous amplitude of the signal applied to the input E is outside the range delimited by the high and low thresholds of the differential amplifier 41, and high in the contrary case. By selecting these two thresholds one on each side of the average value of the signal so as to enclose within said range the flattened portions caused in the received signal, in the baseband, by the residue of the T/4 pulses (curve v in FIG. 3), the timing recovery circuit is prevented from taking into account the transitions preceded and followed by these residual pulses through avoiding, by initializing the time counter 23 when the instantaneous amplitude of the signal applied to the input E passes through the limits of said range, the time counter arriving at its count value which triggers opening of the sorting gate 22 at the time of a sequence of two such flattened portions spaced by the duration T of a symbol.

In the embodiment illustrated, the disabling circuit 40 initializes the time counter 23 when the instantaneous amplitude of the signal applied to the input E crosses the limits of the range delimited by the high and low thresholds of the differential amplifier 41 and, moreover, maintains such initialization throughout the period during which the instantaneous amplitude of this signal remains within this range. Although in practice this results in an embodiment which is slightly more complex, provision could be made for initializing the counter only on passages through the boundaries of this range by replacing, for example, the exclusive-OR gate 42 disposed at the output of the differential amplifier 41 by a transition detector processing the output signal of this amplifier and initializing the counter on each transition of this latter signal.

Figure 5:
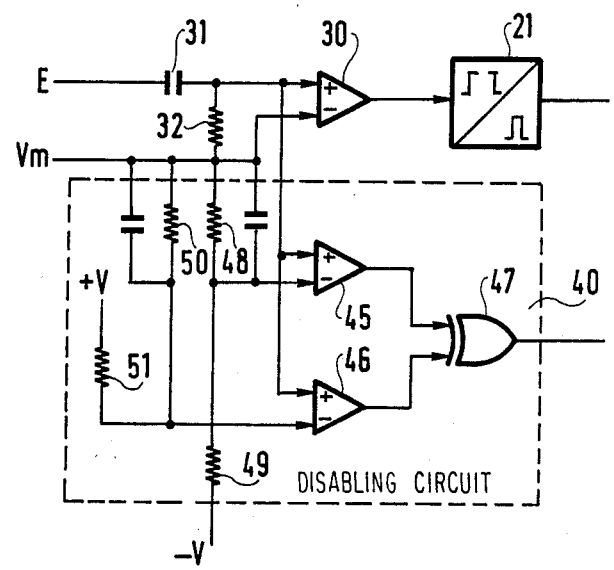
FIG. 5 represents a variant of one part of the circuit represented in FIG. 4.

FIG. 5 represents one embodiment of the disabling circuit 40 of FIG. 4 shown, for ease of understanding, together with the signal shaping circuit 30 and the transition detector circuit 21. In this embodiment the disabling circuit 40 comprises two differential amplifiers 45, 46 of which the outputs are connected to the inputs of an exclusive-OR gate 47. The differential amplifier 45 is configured as a low threshold comparator, its non-inverting input being connected to the input E of the circuit through the intermediary of the coupling capacitor 31 and its inverting input being held at a low threshold potential by the intermediate tap on a resistive divider bridge 48, 49 connected between a point at a potential corresponding to the average value Vm of the signal and a point at a more negative potential $-V$. The differential amplifier 46 is configured as a high threshold comparator, its non-inverting input being connected in parallel with that of the differential amplifier 46 and its inverting input being held at a high threshold potential by the intermediate tap of a resistive divider bridge 50, 51 connected between the point at the potential corresponding to the average value Vm of the signal and a point at a more positive potential $+V$.

Outside the range delimited by the high and low thresholds, the differential amplifiers 45 and 46 have the same output levels, which generates at the output of the exclusive-OR gate 47 a low logic level corresponding to an inactive state of the disabling circuit 40. Within this range, the differential amplifiers 45 and 46 have different output levels resulting in a high logic level at the output of the exclusive-OR gate 47, resulting in the resetting to zero of the time counter 23.

It will be understood that various changes in the details, materials and arrangements of parts, which have been herein described and illustrated in order to explain the nature of the invention, may be made by those skilled in the art within the principle and scope of the invention as expressed in the appended claims.

There is claimed:

1. Timing recovery circuit for synchronous data transmission using a signal which, in the baseband, is formed by a succession of two-level signal elements, without overlap, isochronous and of duration T, able to take one of the four forms defined by the functions:

$$\pm \text{sign}\left(\sin \frac{2\pi t}{T}\right) \; ; \; \pm \text{sign}\left(\cos \frac{2\pi t}{T}\right)$$

said circuit comprising a transition selection circuit adapted to select transitions in the received signal, in the baseband, separated from those which immediately precede them by a time-delay situated in an arbitrary range, bracketing a symbol duration of between ¾ and 5/4 times, exclusive, the duration of a signal element, and a timebase which is synchronised on the transitions selected by said selection circuit and which delivers the signal element recovered timing, wherein said transition selection circuit comprises:

a transition detector for generating a short duration pulse in response to each transition of the received signal in the base band, a gate for sorting the pulses from said transition detector, said gate being inserted between the output of said transition detector and a synchronisation input of said timebase, a first counting circuit reset to zero by the pulses generated by said transition detector and incremented by a first clock signal defining elementary time intervals which are very short relative to the duration of a signal element but longer than the duration of the pulses from said transition detector, said first counting circuit delivering a second clock signal defining elementary time intervals which are short relative to the duration of a signal element, a second counting circuit reset to zero by pulses generated by said first transition detector and incremented by the second clock signal from said first counting circuit, said second counting circuit delivering an overshoot signal when its count value is going to overshoot said given duration measured by means of pulses of said second clock signal, and a hold circuit formed by a D-type bistable having a D input receiving said overshoot signal from said second counting circuit and a clock input receiving said second clock signal from said first counting circuit, an output of said bistable controlling said gate.

2. Circuit according to claim 1, wherein said first clock signal is generated by said timebase.

3. Timing recovery circuit for synchronous data transmission using a signal which, in the baseband, is formed by a succession of two-level signal elements, without overlap, isochronous and of duration T, able to take one of the four forms defined by the functions:

$$\pm \text{sign}\left(\sin \frac{2\pi t}{T}\right) \; ; \; \pm \text{sign}\left(\cos \frac{2\pi t}{T}\right)$$

said circuit comprising a transition selection circuit adapted to select transitions in the received signal, in the baseband, separated from those which immediately precede them by a timedelay situated in an arbitrary range, bracketing a symbol duration of between ¾ and 5/4 times, exclusive, the duration of a signal element, said transition selection circuit including a time counter for determining said symbol duration, and a timebase which is synchronised on the transitions selected by said selection circuit and which delivers the signal element recovered timing, said timing recovery circuit further comprising a circuit adapted to disable said transition selection circuit which initializes said time counter of the latter when the instantaneous amplitude of the received signal, in the baseband, crosses the limits of a predetermined range bracketing the average amplitude of said signal.

4. Circuit according to claim 3, further comprising a signal shaping circuit adapted to detect transitions or crossings of the average value of the received signal, in the baseband, wherein said disabling circuit comprises a differential amplifier configured as a two-threshold comparator with a non-inverting input connected in parallel with that of said signal shaping circuit and an inverting input connected to the intermediate tap of a resistive divider bridge connected between the output of said signal shaping circuit and a point held at a potential corresponding to the average amplitude of the received signal, and a two-input exclusive-OR gate connected to the outputs of said signal shaping circuit and differential amplifier.

5. Circuit according to claim 3, wherein said disabling circuit comprises:
   a first differential amplifier configured as a threshold comparator with a non-inverting input to which is applied the received signal, in the baseband, and an inverting input held at a first voltage threshold below the average amplitude of said signal,
   a second differential amplifier configured as a threshold comparator with a non-inverting input to which is applied the received signal, in the baseband, and an inverting input held at a second voltage threshold above the average amplitude of said signal, and
   an exclusive-OR gate with two inputs connected to the outputs of said two differential amplifiers.

* * * * *